(12) United States Patent
Fryfogle

(10) Patent No.: US 10,584,482 B2
(45) Date of Patent: *Mar. 10, 2020

(54) BLOCKS AND MOLDS FOR BUILDING LANDSCAPE WALLS AND METHODS OF MAKING THE BLOCKS

(71) Applicant: Vaughn Fryfogle, Lucedale, MS (US)

(72) Inventor: Vaughn Fryfogle, Lucedale, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,686

(22) Filed: Mar. 18, 2019

(65) Prior Publication Data
US 2019/0211547 A1    Jul. 11, 2019

Related U.S. Application Data

(63) Continuation of application No. 15/703,325, filed on Sep. 13, 2017, now Pat. No. 10,273,683.

(60) Provisional application No. 62/409,024, filed on Oct. 17, 2016.

(51) Int. Cl.
| | |
|---|---|
| *E04B 2/08* | (2006.01) |
| *B28B 7/00* | (2006.01) |
| *B28B 7/16* | (2006.01) |
| *E04C 1/39* | (2006.01) |
| *A01G 9/28* | (2018.01) |
| *E04B 2/12* | (2006.01) |

(Continued)

(52) U.S. Cl.
CPC ............... *E04B 2/08* (2013.01); *A01G 9/28* (2018.02); *B28B 7/0079* (2013.01); *B28B 7/0097* (2013.01); *B28B 7/162* (2013.01); *E04B 2/12* (2013.01); *E04C 1/39* (2013.01); *E04C 1/395* (2013.01); *E02D 17/205* (2013.01); *E04B 2002/0213* (2013.01); *E04B 2002/0265* (2013.01); *E04B 2103/02* (2013.01)

(58) Field of Classification Search
CPC ...... E04B 2/08; E04B 2/12; E04B 2002/0213; E04B 2002/0265; A01G 9/28; B28B 7/0079; E04C 1/39; E04D 17/205
See application file for complete search history.

(56) References Cited

U.S. PATENT DOCUMENTS

| | | | | |
|---|---|---|---|---|
| 4,314,431 | A | * | 2/1982 | Rabassa ..................... E04B 2/46 52/259 |
| 4,982,535 | A | * | 1/1991 | Pickett .................. E01F 8/0023 256/16 |

(Continued)

OTHER PUBLICATIONS

Definition of the term 'unitary' found at: https://www.merriam-webster.com/dictionary/unitary.*

*Primary Examiner* — Brian D Mattei
(74) *Attorney, Agent, or Firm* — C. Brandon Browning; Maynard, Cooper & Gale, PC

(57) ABSTRACT

The present disclosure generally pertains to blocks for building landscape walls and similar structures, the molds used to make the blocks, and the methods for making the blocks. Such block can be securely coupled to another block. A block can be vertically coupled to another block by coupling the dorsal face of one block to the ventral face of another block. The block can be horizontally coupled by coupling the male side of one block to the female side of another block. A secure, exemplary landscape wall may be created by coupling the blocks both horizontally and vertically to reach a desired height, width, and shape.

11 Claims, 7 Drawing Sheets

(51) Int. Cl.
    *E02D 17/20*     (2006.01)
    *E04B 2/02*      (2006.01)

(56) References Cited

U.S. PATENT DOCUMENTS

| | | | | |
|---|---|---|---|---|
| 5,003,746 | A * | 4/1991 | Wilston | A63H 33/042 |
| | | | | 52/592.1 |
| 5,119,587 | A * | 6/1992 | Waltz | A01G 9/28 |
| | | | | 47/33 |
| 5,154,032 | A * | 10/1992 | Ritter | E04C 1/395 |
| | | | | 405/284 |
| 5,651,642 | A * | 7/1997 | Kelley, Jr. | E02D 29/025 |
| | | | | 405/284 |
| 6,244,009 | B1 * | 6/2001 | Cerrato | E04B 2/08 |
| | | | | 52/223.7 |
| 10,273,683 | B2 * | 4/2019 | Fryfogle | E04B 2/08 |
| | | | | 52/604 |
| 2007/0245673 | A1 * | 10/2007 | Cerrato | E04B 2/18 |
| | | | | 52/607 |
| 2014/0007529 | A1 * | 1/2014 | Alvarez Moysen | E04B 2/18 |
| | | | | 52/220.2 |
| 2015/0354213 | A1 * | 12/2015 | Burnquist | E04C 1/39 |
| | | | | 52/604 |
| 2016/0222655 | A1 * | 8/2016 | Lin | E04B 2/08 |

\* cited by examiner

BLOCKS AND MOLDS FOR BUILDING LANDSCAPE WALLS AND METHODS OF MAKING THE BLOCKS

CROSS-REFERENCE TO RELATED APPLICATION

This application claims priority to U.S. Non-provisional patent application Ser. No. 15/703,325, titled "Blocks and Molds for Building Landscape Walls and Methods of Making the Blocks" and filed on Sep. 13, 2017, which claims priority to U.S. Provisional Patent Application No. 62/409,024, titled "Blocks and Molds for Building Landscape Walls and Methods of Making the Blocks," and filed on Oct. 17, 2016, the entire contents of which are incorporated herein by reference.

BACKGROUND OF THE INVENTION

Numerous types of landscaping blocks, and methods of using such blocks, exist for the construction of walls, borders, or edging. Such landscaping blocks may be decorative, act to separate different areas of the landscape, or serve a structural purpose, for example in the form of a retaining wall to stabilize slopes or protect such slopes from erosion. Landscapes, however, are typically irregular in shape, such that walls, borders and edging must follow the landscape in a non-linear pattern.

Conventional landscaping blocks, however, do not lend themselves to such non-linear patterns. Assembly of conventional landscaping blocks, which are typically rectangular in shape, in a non-linear pattern results in large, angular gaps between adjacent blocks when placing such blocks at an angle. This gap reduces the aesthetic appeal and structural integrity of such assembly of landscaping blocks by reducing the points of contact between adjacent blocks. This is typically addressed either by using mortar between blocks or by shaping the edges of blocks such that one edge is convex while the opposing edge is concave, to permit some measure of rotation between adjacent blocks.

Another challenge when constructing walls, borders and edging using landscaping blocks is maintaining the integrity of such structures. Conventional blocks are often displaced by various forces, such as growth of plants or shifting of earth, such that the appearance and/or integrity of the structure become compromised over time. This may be addressed conventionally by applying mortar between blocks or by using landscaping blocks configured to interlock with one another.

Current solutions to the non-linear placement, and maintenance of the integrity of, conventional landscaping block assemblies, as described above, however, are not ideal. Mortar, for example, lacks ease of assembly, is prone to cracking, and does not allow rearrangement of landscaping blocks. Further, landscaping blocks that are configured to interlock to maintain structural integrity have limited range of motion and/or only interlock with adjacent, but not stacked, landscaping blocks.

SUMMARY OF THE INVENTION

In one embodiment, the present disclosure relates to a block comprising: a male side, a female side, two lateral faces, a dorsal face, and a ventral face; wherein the planes of the dorsal face and the ventral face are approximately parallel; wherein the lateral faces are approximately parallel; wherein the ventral face comprises a circular indentation that is indented orthogonally to the ventral face and is positioned equidistant from each lateral face and proximal to the male side; wherein the male side is convex; and wherein the female side is concave. In certain embodiments, the dorsal face comprises a circular protrusion that protrudes orthogonally from the dorsal face and is positioned equidistant from each lateral face and proximal to the male side; wherein the depth of the circular indentation relative to the ventral face is about the same distance as the protrusion of the circular protrusion from the dorsal face; wherein the radius of the circular indentation is about equal to the radius of the circular protrusion. In certain embodiments, the circular protrusion is beveled, wherein the circumference of the circular protrusion decreases within increasing distance from the dorsal face; and wherein the circular indentation is beveled, wherein the circumference of the circular indentation decreases within increasing distance from the ventral face. In certain embodiments, a cylindrical channel connects the center of the circular protrusion and the circular indentation.

In certain embodiments, the ventral face further comprises a channel extending from the half of the circular indentation distal from the male side of the ventral face and extending to the female side of the ventral face; wherein the width of the channel is equal to the diameter of the circular indentation, wherein the channel is positioned equidistant from each lateral face; wherein the depth of the channel is equal to the depth of the circular indentation; and wherein the edges of the channel proximal to each lateral face comprises a bevel about equal to the bevel of the circular indentation; and the dorsal face further comprises a cleat that is separated from the circular protrusion distal from the male side and which protrudes orthogonally from the dorsal face and spans the length of the dorsal face to the female side; wherein the cleat is positioned equidistant from each lateral face, has a width equal to the diameter of the circular protrusion, and protrudes the same distance as the circular protrusion from the dorsal face; wherein the edge of the cleat proximal to the circular protrusion is circular with a radius about equal to the radius of the circular protrusion; and wherein the cleat comprises a bevel about equal to the bevel of the circular protrusion. In certain embodiments, a cylindrical channel connects the center of the circular protrusion and the circular indentation.

In another embodiment, the present disclosure relates to an accessory block comprising: a dorsal face and a ventral face; wherein the dorsal face and ventral face are circular, have an equal radius, and are parallel; and wherein the ventral face comprises a circular indentation that is centered in, and indented orthogonally to, the ventral face. In certain embodiments, the dorsal face comprises a circular protrusion that is centered in, and protrudes orthogonally from, the dorsal face; wherein the depth of the circular indentation relative to the ventral face is about the same distance as the protrusion of the circular protrusion from the dorsal face; and wherein the radius of the circular indentation is about equal to the radius of the circular protrusion. In certain embodiments, the diameter of the dorsal face and ventral face is about equal to the perpendicular distance between the lateral faces of the block of claim 1. In certain embodiments, a cylindrical channel connects the center of the circular protrusion and the circular indentation.

In another embodiment, the present disclosure relates to a method of manufacturing a block comprising the steps of: coupling a lower mold and a housing; pouring a moldable material into the housing; lowering an upper mold such that the upper mold contacts the moldable material; allowing the moldable material to become rigid; removing the moldable material from the lower mold, housing and upper mold; wherein the housing comprises a hollow chamber, a male side and a female side, wherein the male side comprises a convex protrusion and the female side comprises a convex indentation; wherein the upper form comprises an upper form and an upper block, wherein the upper form comprises a lower surface, a male side and a female side, wherein the male side comprises a convex protrusion and the female comprises a convex indentation; and wherein the upper block comprises a male side and a female side, wherein the male side comprises a convex protrusion and the female comprises a convex indentation. In certain embodiments, the upper form is lowered using a hydraulic press.

In certain embodiments, the moldable material is capable of being poured into the hollow chamber, forming a shape based on the lower mold, upper mold and housing, and becoming rigid. In certain embodiments, the moldable material is concrete.

In certain embodiments, the lower form comprises a circular protrusion on the upper surface, wherein the circular protrusion is proximal to the male side of the lower form. In certain embodiments, the lower form further comprises a cylinder extending orthogonally from the center of the circular protrusion. In certain embodiments, the lower form further comprises an elongated protrusion extending from the half of the circular protrusion distal from the male side of the lower form and extending to the female side of the lower form, wherein the elongated protrusion extends orthogonally from the upper surface of the lower form at about the same distance as the circular protrusion and has a width about equal to the diameter of the circular protrusion.

In certain embodiments, the upper form comprises a lower surface that is approximately flat. In certain embodiments, the upper form comprises a circular indentation in the lower surface, wherein the circular indentation is proximal to the male side of the upper form. In certain embodiments, the upper form further comprises a cylinder extending orthogonally from the center of the circular indentation. In certain embodiments, the upper form further comprises an elongated indentation that is separated from the circular indentation distal from the male side of the upper form and which spans the length of the lower surface to the female side of the upper form; wherein the elongated indentation has a width equal to the diameter of the circular indentation and is indented about the same distance as the circular indentation into the upper form; wherein the edge of the elongated protrusion proximal to the circular indentation is circular with a radius about equal to the radius of the circular indentation.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to blocks for building landscape walls and other similar structures, the molds used to make the blocks, and the methods for making the blocks. A block in accordance with one embodiment of the present disclosure comprises a block which can be securely coupled to another block in accordance with the same embodiment. In a preferred embodiment, the block can be horizontally coupled to another block by coupling the male side of one block to the female side of another block. The block can be vertically coupled by coupling the ventral face of one block to the dorsal face of another block. A secure, exemplary landscape wall may be created by coupling the blocks both horizontally and vertically to reach a desired height, width, and shape.

Figure 1:
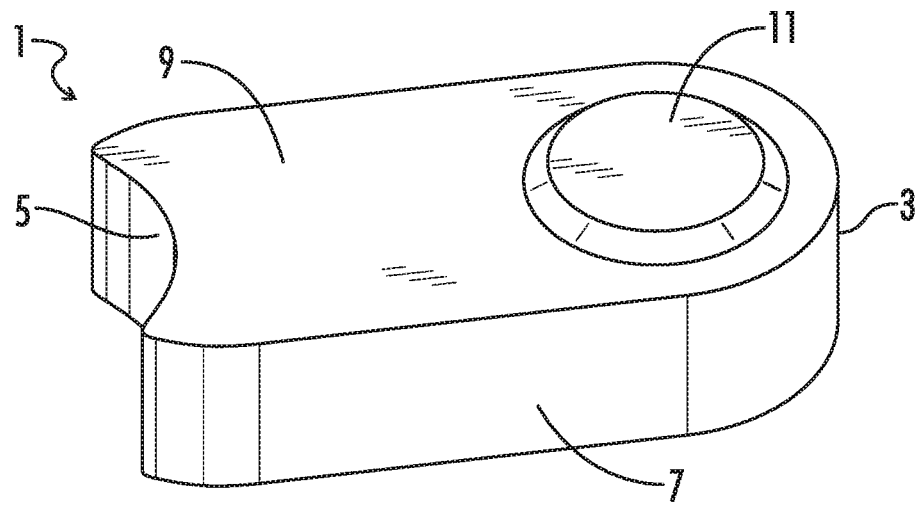
FIG. 1 is an illustration showing an exemplary embodiment of a block.
Figure 2:
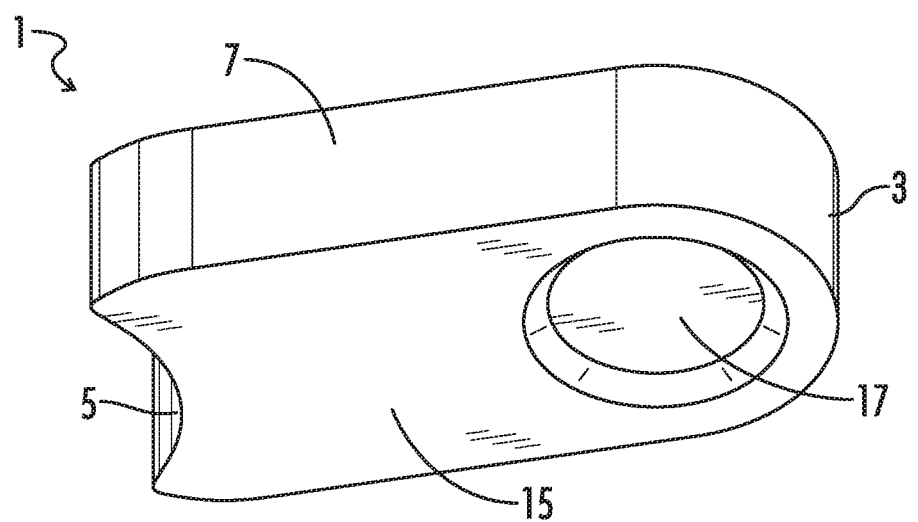
FIG. 2 is an illustration showing an alternate view of the block in FIG. 1.

FIGS. 1 and 2 depict an exemplary block 1. The block 1 comprises a male side 3, a female side 5, two lateral faces 7, a dorsal face 9, and a ventral face 15. The planes of the dorsal face 9 and the ventral face 15 are approximately parallel. The lateral faces 7 are also approximately parallel. In some embodiments, the portion of each lateral face 7 proximal to the female side 5 is rounded. The dorsal face 9 comprises a circular protrusion 11 that protrudes orthogonally from the dorsal face 9 and is positioned equidistant from each lateral face 7 and proximal to the male side 3. The ventral face 15 comprises a circular indentation 17 that is indented orthogonally to the ventral face 15 and is positioned equidistant from each lateral face 7 and proximal to the male side 3. The circular indentation 17 is indented from the plane of the ventral face 15 at a distance that is about the equal to the distance that the circular protrusion 11 extends from the plane of the dorsal face 9. Further, the radius of the circular indentation 17 is about equal to the radius of the circular protrusion 11.

Figure 3:
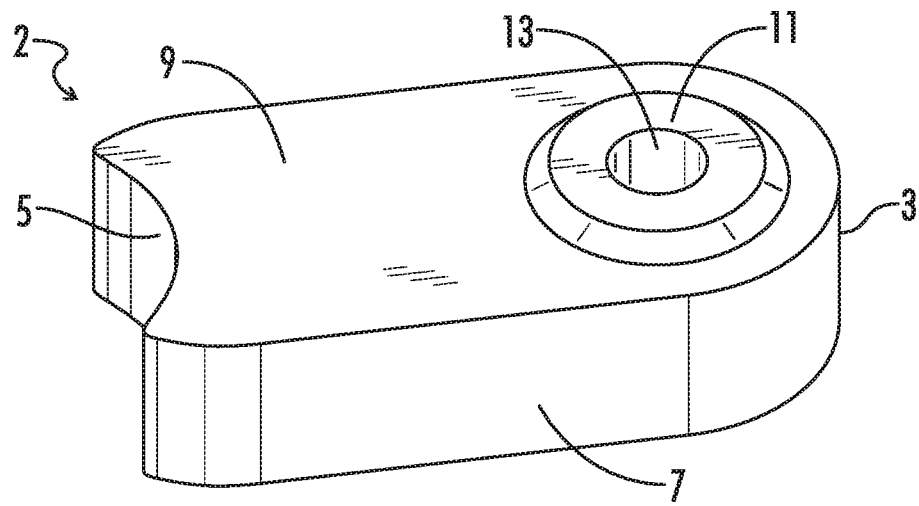
FIG. 3 is an illustration showing an alternate embodiment of a block.
Figure 4:
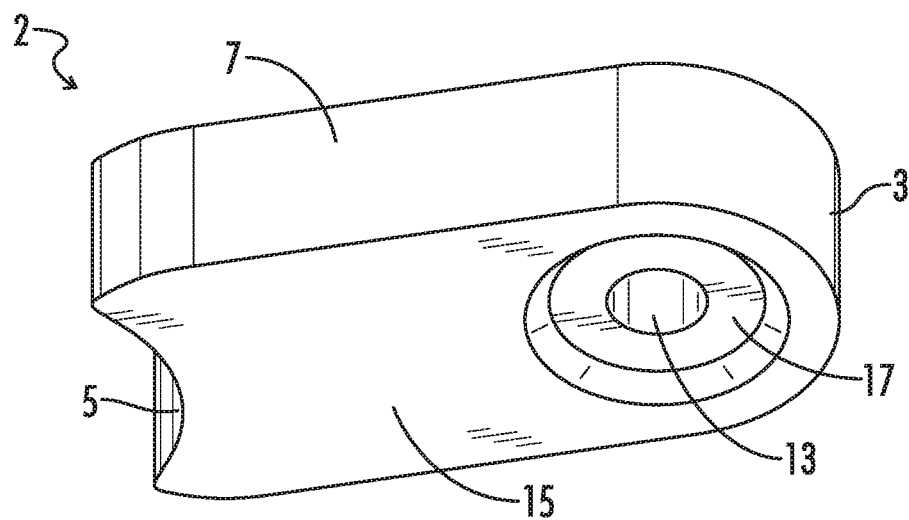
FIG. 4 is an illustration showing an alternate view of the block in FIG. 3.

In some embodiments, as shown in FIGS. 3 and 4, the block 1 may further comprise a cylindrical channel 13 connecting the center of the circular protrusion 11 to the center of the circular indentation 17, thereby forming an alternative block 2. When stacking blocks 2, a rod may be inserted through multiple cylindrical channels 13 to provide additional structural rigidity. Alternatively, the cylindrical channels 13 may be left unfilled to provide weight savings.

Figure 5:
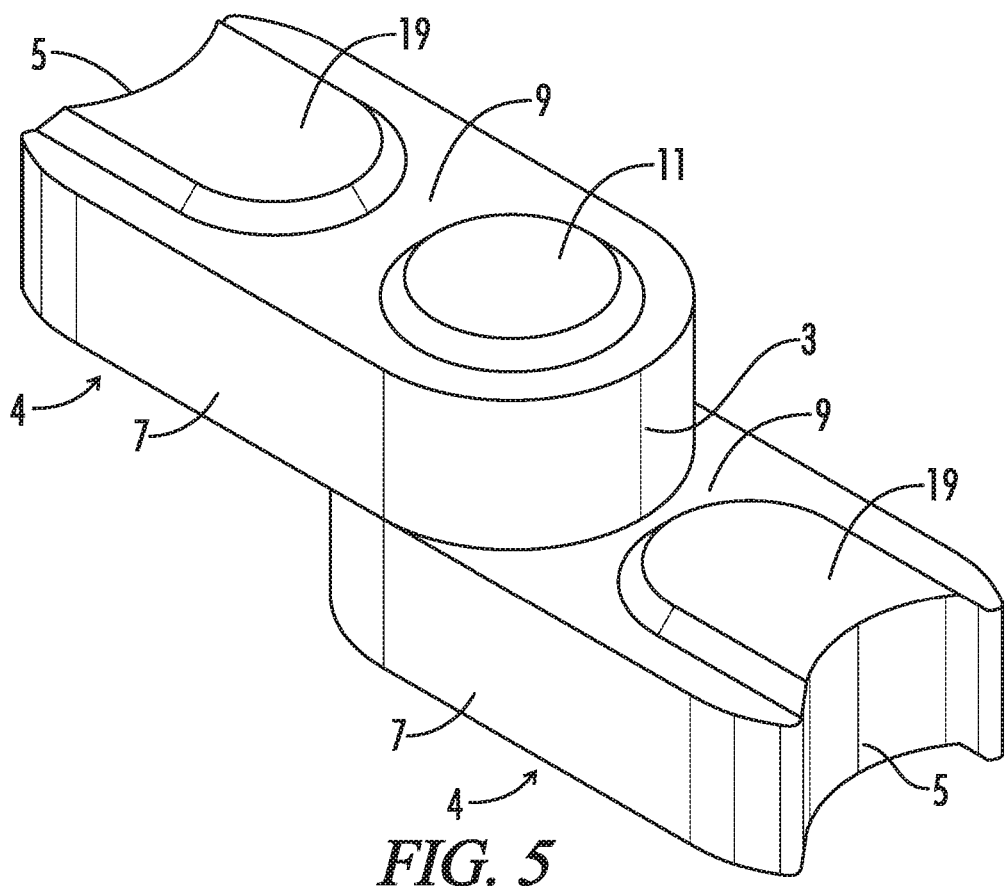
FIG. 5 is an illustration showing an alternative embodiment of a block stacked on a second block.
Figure 6:
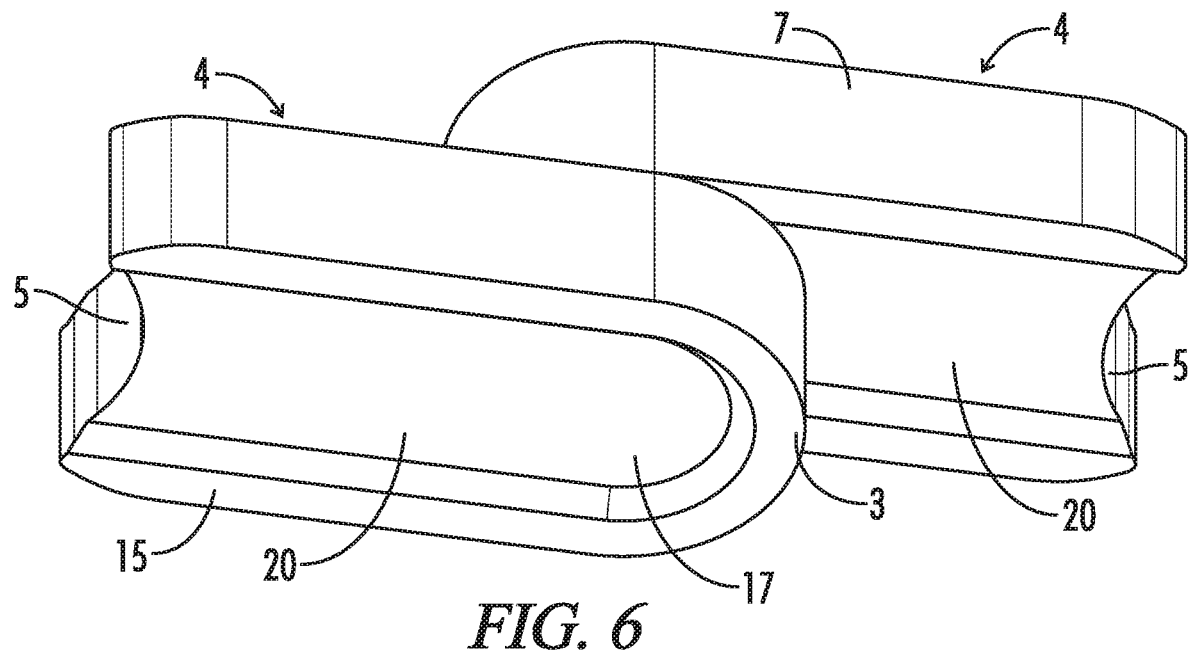
FIG. 6 is an illustration showing an alternate view of a block stacked on a second block as depicted in FIG. 5.

In some embodiments, the dorsal face 9 of the block 1 further comprises a cleat 19 that is separated from the circular protrusion 11 distal from the male side 3 and which protrudes orthogonally from the dorsal face 9 and spans the length of the dorsal face 9 to the female side 5, as shown in FIG. 5, thereby forming an alternative block 4. The cleat 19 is positioned equidistant from each lateral face 7, has a width equal to the diameter of the circular protrusion 11, and protrudes the same distance as the circular protrusion 11 from the dorsal face 9. Further, the edge of the cleat 19 proximal to the circular protrusion 11 is circular with a radius about equal to the radius of the circular protrusion 11. In addition, the cleat comprises a bevel about equal to the bevel of the circular protrusion 11. In some embodiments, the ventral face 15 of the block 4 further comprises a channel 20 extending from the half of the circular indentation 17 distal from the male side 3 of the ventral face 15 and extending to the female side 5 of the ventral face 15, as shown in FIG. 6. The width of the channel 20 is about equal to the diameter of the circular indentation 17. Further, the channel 20 is positioned equidistant from each lateral face 7, and the depth of the channel 20 is about equal to the depth of the circular indentation 17. In addition, the edges of the channel 20 proximal to each lateral face 7 comprise a bevel about equal to the bevel of the circular indentation 17.

Figure 7:
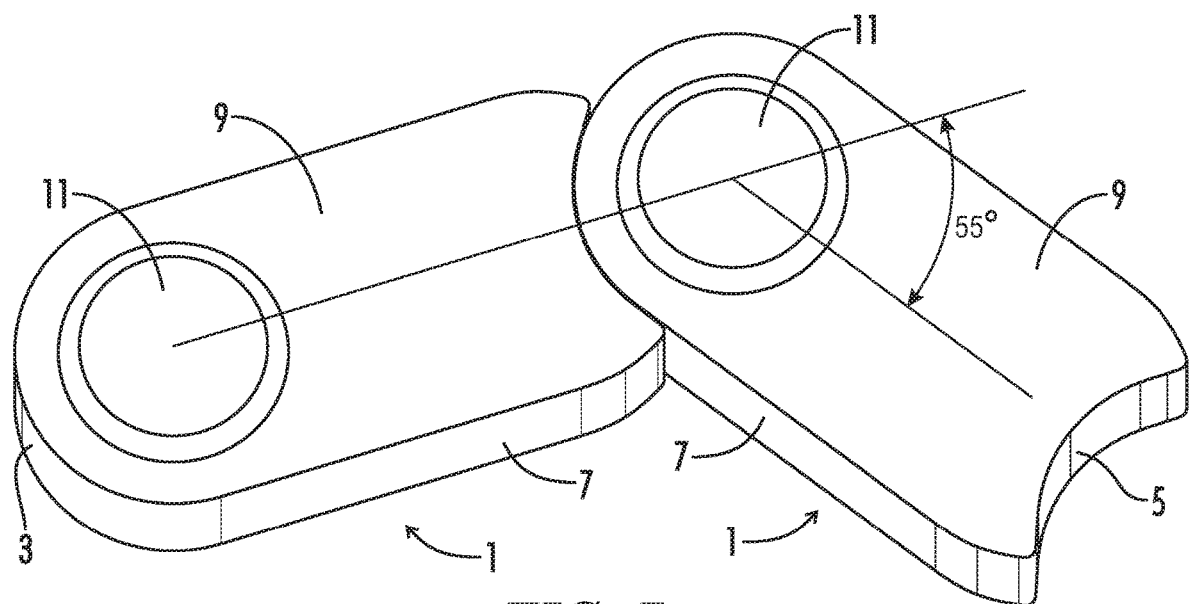
FIG. 7 is an illustration showing the male side of one block in contact with the female side of a second block such that the two blocks form a 55 degree angle.
Figure 8:
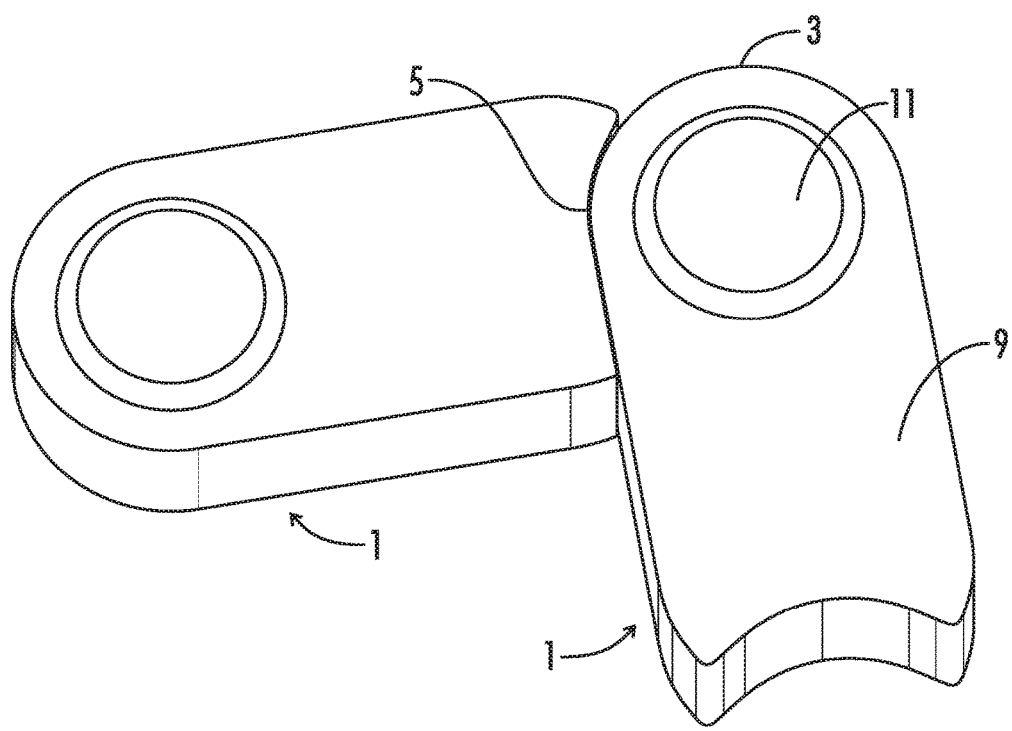
FIG. 8 is an illustration showing the male side of one block in contact with the female side of a second block, wherein the convex indentation on the female side of the second block comprises only half the female side, such that the two block form a 90 degree angle.

The male side 3 of the blocks 1, 2 and 4 are convex, and the female side 5 of blocks 1, 2 and 4 may be concave, as shown in FIGS. 1-7. Alternatively, half of the female side 5 may be flat (perpendicular to each lateral face 7 as well as the dorsal face 9 and ventral face 15) as shown in FIG. 8. If the female side 5 is concave, the male side 3 may contact the female side 5 forming up to a 55 degree angle relative to the lateral faces 7, as shown in FIG. 7. If half of the female side 5 is flat, the male side 3 may contact the female side 5 forming up to a 90 degree angle relative to the lateral faces 7, as shown in FIG. 8.

Figure 9:
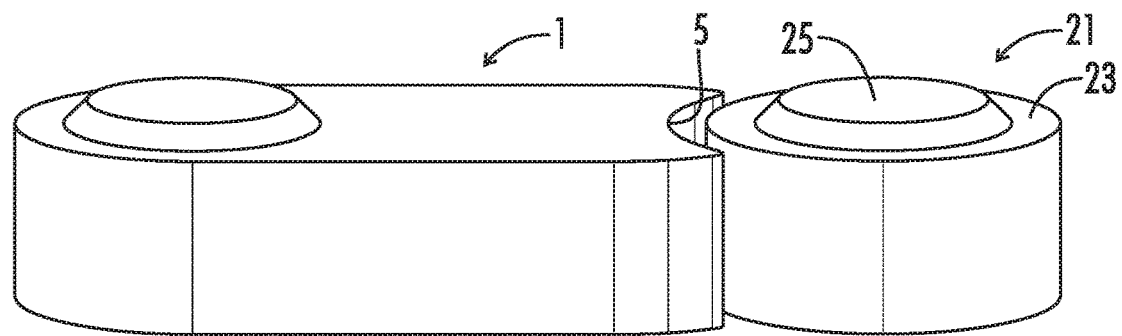
FIG. 9 is an illustration showing the dorsal face of an accessory block adjacent to the female side of a block.
Figure 10:
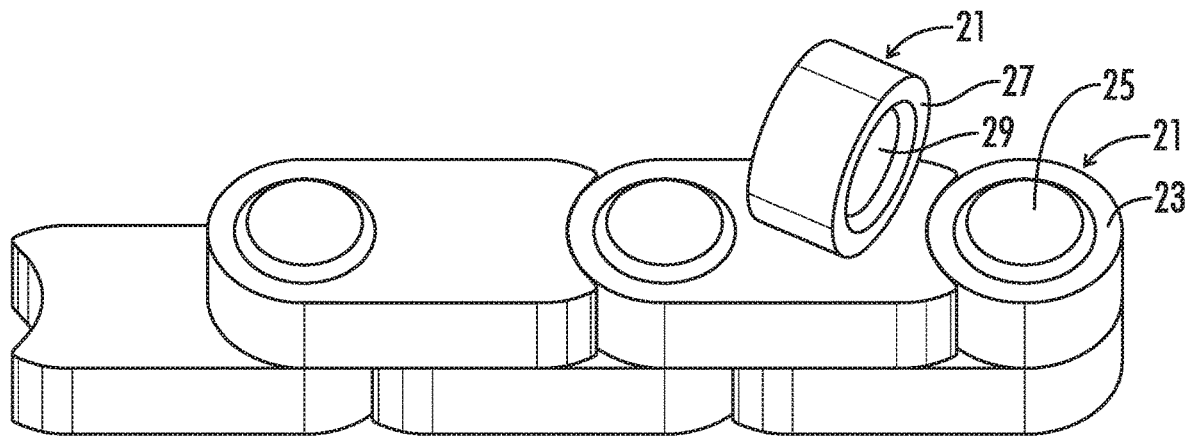
FIG. 10 is an illustration showing the ventral face of an accessory block.
Figure 12:
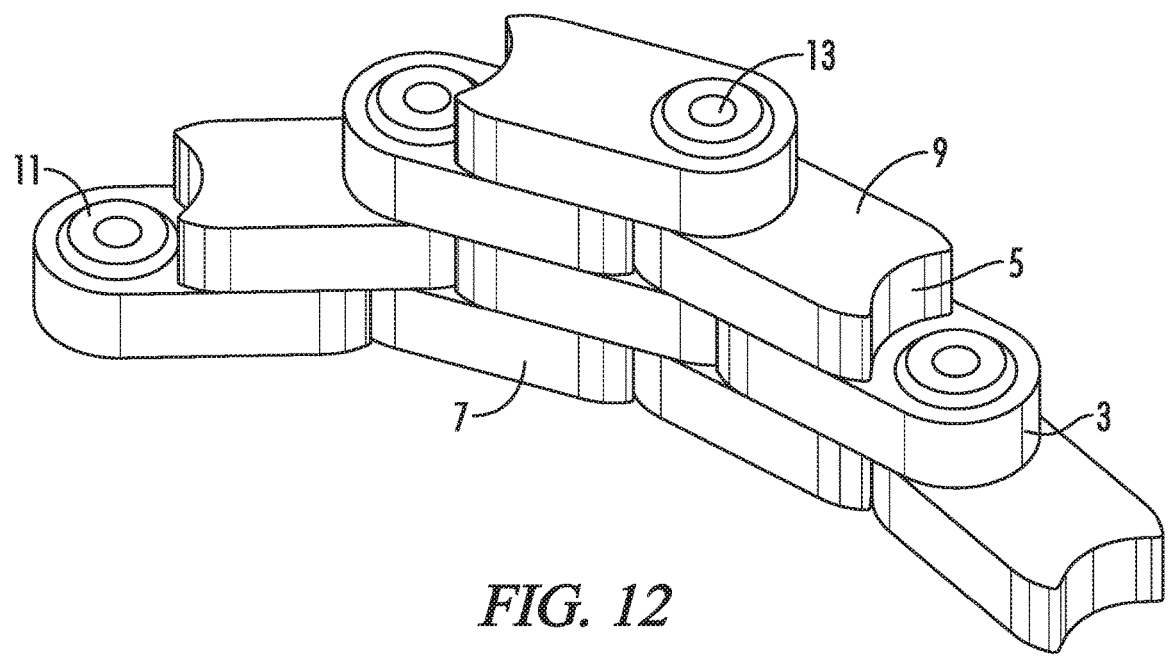
FIG. 12 is an illustration showing a wall formed from multiple layers of blocks connected vertically and horizontally.
Figure 13:
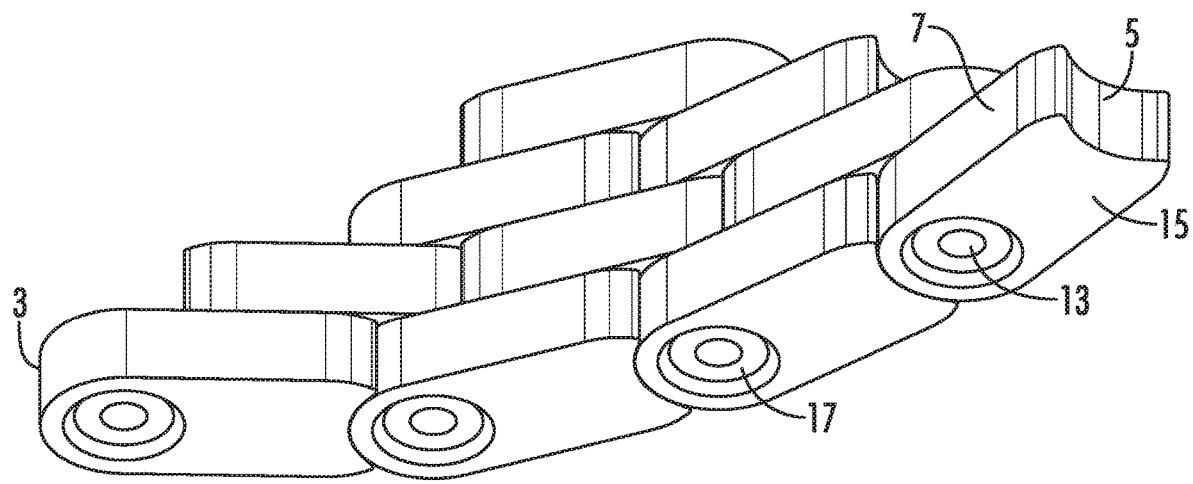
FIG. 13 is an illustration showing an alternative view of the wall formed from multiple layers of blocks connected vertically and horizontally shown in FIG. 12.

Also disclosed herein, as shown in FIGS. 9 and 10, is an accessory block 21 that comprises a dorsal face 23 and a ventral face 27. The dorsal face 23 and ventral face 27 are circular, have an equal radius, and are parallel. Further, as shown in FIG. 9, the accessory block 21 is configured to fit within the female side 5 of a block 1, 2 or 4, and the dorsal face 23 comprises a circular protrusion 25 that is centered in, and protrudes orthogonally from, the dorsal face 23. As shown in FIG. 10, the ventral face 27 comprises a circular indentation 29 that is centered in, and indented orthogonally to, the ventral face 27. The depth of the circular indentation 29 relative to the ventral face 27 is about the same distance as the protrusion of the circular protrusion 25 from the dorsal face 23. In addition, the radius of the circular indentation 29 is about equal to the radius of the circular protrusion 25. The diameter of the dorsal face 23 and ventral face 27 is about equal to the perpendicular distance between the lateral faces 7 of the blocks 1, 2 and 4 described in the preceding paragraphs of this disclosure. Such accessory blocks 21 are useful to create a vertical edge when assembling rows of blocks 1, 2 and/or 4, which interlock such that each row is staggered with respect to each row above and below it. This staggering of blocks 1, 2 and/or 4 results in a cascading edge, as shown in FIGS. 12 and 13. The accessory block 21 may be stacked on top of a partially-exposed dorsal face 9 of a block 1, 2 or 4.

Figure 11:
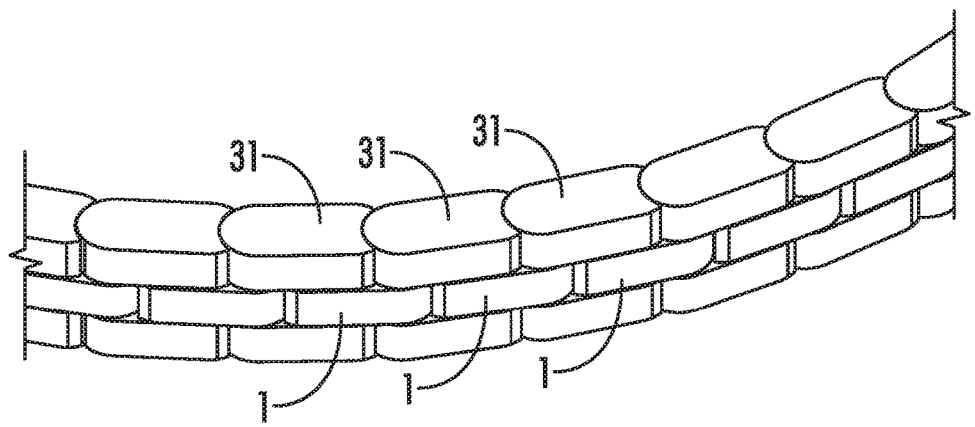
FIG. 11 is an illustration showing a wall formed from multiple layers of blocks connected vertically and horizontally, wherein the top row of the blocks comprises capping blocks.

In another embodiment, the dorsal face 9 of block 1 may be a smooth plane, without a circular protrusion 11, for example as shown in FIG. 11, thereby forming a capping block 31 suitable for a top row of an assembly of blocks 1, 2 and/or 4.

Multiple blocks 1, 2, 4, 21 and/or 31 can be configured in rows to create a desired shape for the landscape wall, for example as depicted in FIGS. 12 and 13. The ability of the male side 3 and female side 5 to connect at up to a 90 degree angle allows for configurations that are useful in creating a landscape wall. As an example, if a landscape wall surrounding a tree is desired, the blocks 1, 2, 4, 21, and/or 31 may be positioned such that a circular configuration is created around the tree by configuring an appropriate angle between each block 1, 2, 4, 21, and/or 31. The range of configurations allowed by the variable angle between a male side 3 and a female side 5 also allows a row of blocks 1, 2, 4, 21, and/or 31 to be configured around other objects, such as shrubbery or hills. Further, if capping blocks 31 are used on a top row of a wall, the top of such wall will be smooth, as shown in FIG. 11.

Blocks 1, 2, 4, 21 or 31 can also be vertically coupled to another block 1, 2, 4, 21 or 31. As depicted in FIGS. 5 and 6, the dorsal face 9 may comprise a circular protrusion 11 extending orthogonally from the dorsal face 9, and the ventral face 15 may comprise a circular indentation 17 indented orthogonally to the ventral face 15. The circular protrusion 11 is generally circular and configured to be securely coupled to the circular indentation 17 by positioning the circular indentation 17 over the circular protrusion 11. The dorsal face 9 of a bottom block 1 or 2 can be coupled to the ventral face 15 of a top block 1 or 2, for example, by coupling the circular protrusion 11 of the bottom block 1 or 2 and the circular indentation 17 of the top block 1 or 2. By coupling the dorsal face 9 of the bottom block 1 or 2 to the ventral face 17 of the top block 1 or 2 via the circular protrusion 11 and the circular indentation 17, a staggered structure is created which promotes stability in an exemplary landscape wall.

An exemplary landscape wall, as depicted in FIGS. 12 and 13, can be created through a combination of the horizontal coupling (between male sides 3 and female sides 5) and vertical coupling (between circular protrusions 11 and circular indentations 17 and/or cleats 19 and channels 20). A secure landscape wall is created by vertically coupling the rows of blocks to reach a desired height and horizontally coupling the individual blocks in each row to reach a desired length and shape.

Figure 14:
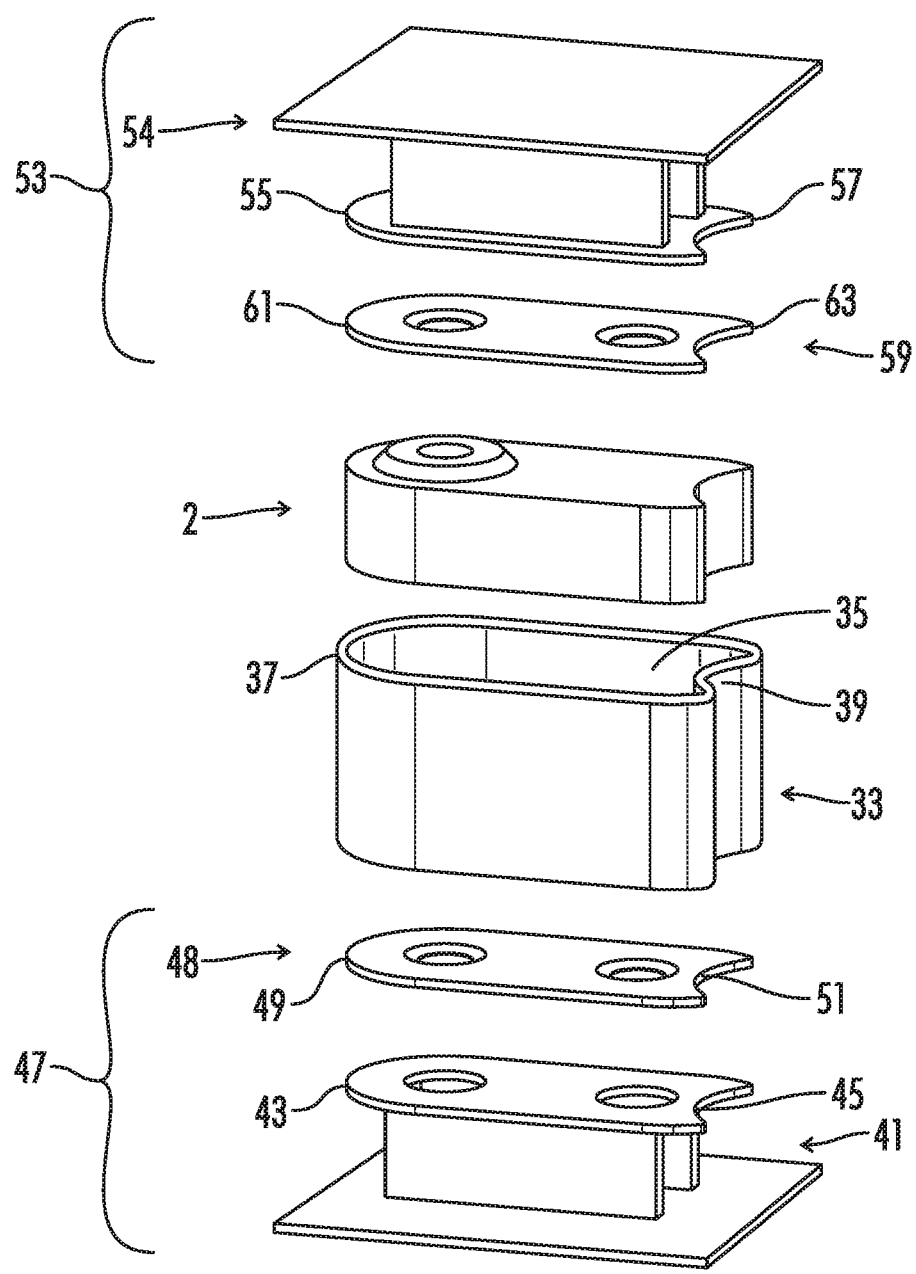
FIG. 14 is an illustration showing the molds used to make blocks for building landscape walls.

The present disclosure also pertains to a method of making blocks and the materials configured to form such blocks, as shown in FIG. 14. In an exemplary process, a housing 33, a lower mold 47, an upper mold 53, and moldable material (not shown) are provided. The lower mold 47 is coupled to the housing 33. The housing 33 is filled with moldable material, forming a ventral face on the bottom of the moldable material, such that the shape of the ventral face is determined by the shape of the lower mold 47. The upper mold 53 is then lowered and pressed, for example using a hydraulic press, into the top of the moldable material in the housing 33, forming a dorsal face on the top of the moldable material, such that the shape of the dorsal face is determined by the shape of the upper mold 59. Once rigid or otherwise capable of maintaining its shape, the moldable material may then be removed from the lower mold 47, housing 33 and upper mold 53, forming a block, for example block 2 comprising a dorsal face 9, ventral face 15, male side 3, female side 5, lateral sides 7, a circular protrusion 11, a circular indentation 17 and a cylindrical channel 13.

The housing 33 is a form that comprises a hollow chamber 35, a male side 37, an opposing female side 39 and two lateral sides. The male side 37 comprises a convex protrusion, and the female side 39 comprises a convex indentation approximately equal to the dimensions of the male side 3 and female side 5 of block 1, respectively. The housing 33 is comprised of material capable of withstanding compression, such as metal or other material known in the art.

The lower mold 47 comprises a lower block 41 coupled to a lower form 48 using methods known in the art. The lower block 41 and lower form 48 comprise a male side 43 and a male side 49, respectively, each of which comprises a convex protrusion approximately equal to the dimensions of the male side 3 of block 1. The lower block 41 and lower form 48 further comprise a female side 45 and a female side 51, respectively, each of which comprises a convex indentation approximately equal to the dimensions of the female side 5 of block 1. The lower mold 47 is comprised of material capable of withstanding compression, such as metal or other material known in the art.

The lower mold 47 is configured to allow coupling to the housing 33. The lateral edges of the lower mold 47 may be configured to be flush with the walls of the hollow chamber 35 of the housing 33. For example, the male side 49 of the lower form 48 and the male side 43 of the lower block 41 are configured to be flush with the male side 37 of the housing 33, the female side 51 of the lower form 48 and the female side 45 of the lower block 41 are configured to be flush with the female side 39 of the housing 33, and the lateral sides of the lower form 48 and the lower block 41 are configured to be flush with the lateral sides of the hollow chamber 45. As used herein, flush means in contact with. In one example of coupling, the lower mold 47 may be placed within the hollow chamber 35 of the housing 33. Alternatively, the housing 33 may lack a base, such that the lower mold 47 may be raised into the hollow chamber 35 of the housing 33. The lower form 48 is configured such that its upper surface (the surface distal from the lower block 41) is the reciprocal, or inverse, form of the ventral face of the intended block. For example, when forming the block 2 shown in FIG. 3, the upper surface of the lower form 48 comprises a circular protrusion proximal to the male side 49 of the lower form 48 that is about equal to the circular protrusion 11 of the intended block 2, further comprising a cylinder protruding orthogonally from the center of the circular protrusion such that, when pressed against moldable material, a circular indentation and cylindrical channel are made in the moldable material that are about equal to the circular indentation 17 and cylindrical channel 13 of the intended block 2 (alternatively, if block 1 is desired, the lower form would lack the cylinder). As another example, if the intended block is the capping block 31, the upper surface of the lower form 48 comprises a flat surface without a circular protrusion or cylinder.

The upper mold 53 comprises an upper block 54 coupled to an upper form 59 using methods known in the art. The upper block 54 and upper form 59 comprise a male side 55 and a male side 61, respectively, each of which comprises a convex protrusion approximately equal to the dimensions of the male side 3 of block 1. The upper block 54 and upper form 59 further comprise a female side 57 and a female side 63, respectively, each of which comprises a convex indentation approximately equal to the dimensions of the female side 5 of block 1. The upper mold 53 is comprised of material capable of withstanding compression, such as metal or other material known in the art.

The upper mold 53 is configured to allow coupling to the housing 33. The lateral edges of the upper mold 53 may be configured to be flush with the walls of the hollow chamber 35 of the housing 33. For example, the male side 61 of the upper form 59 and the male side 55 of the upper block 54 are configured to be flush with the male side 37 of the housing 33, the female side 63 of the upper form 59 and the female side 57 of the upper block 54 are configured to be flush with the female side 39 of the housing 33, and the lateral sides of the upper form 59 and the upper block 54 are configured to be flush with the lateral sides of the hollow chamber 45. The upper mold 53 may be lowered into the hollow chamber 35 of the housing 33. The upper form 59 is configured such that its lower surface (the surface distal from the upper block 54) is the reciprocal, or inverse, form of the dorsal face of the intended block. For example, when forming the block 2 shown in FIG. 3, the lower surface of the upper form 59 comprises a circular indentation proximal to the male side 61 of the upper form 59 that is about equal to the circular indentation 17 of the intended block 1, further comprising a cylinder protruding orthogonally from the center of the circular indentation such that, when pressed against moldable material, a circular protrusion and cylindrical channel are made in the moldable material that are about equal to the circular protrusion 11 and cylindrical channel 13 of the intended block 2 (alternatively, if block 1 is desired, the upper form would lack the cylinder).

The moldable material is capable of being poured into the hollow chamber 35 of the housing 33 and filling the volume contained within the hollow chamber 35. The moldable material is also capable of being shaped by the lower mold 47, housing 33 and upper mold 53. The moldable material is capable of forming into a rigid block. In an exemplary embodiment, the moldable material is concrete. The moldable material may also comprise other suitable material known in the art.

The landscaping blocks disclosed herein provide significant benefits compared with conventional blocks. Conventional landscaping blocks either permit range of motion between two adjoining blocks without a means of securing the two blocks together, or such blocks include a means of securing adjacent blocks together without the ability to allow range of motion between two adjoining blocks. The presently disclosed landscaping blocks, in contrast, not only secure adjacent blocks to one another, but also permit a wide range of motion between such blocks, providing a combination of flexibility and structural integrity when combining such blocks to form walls or other similar structures.

This application references various publications. The disclosures of these publications, in their entireties, are hereby incorporated by reference into this application to describe more fully the state of the art to which this application pertains. The references disclosed are also individually and specifically incorporated herein by reference for material contained within them that is discussed in the sentence in which the reference is relied on.

The methodologies and the various embodiments thereof described herein are exemplary. Various other embodiments of the methodologies described herein are possible.

Now, therefore, the following is claimed:
1. A wall building system comprising:
   a plurality of blocks configured for building a wall, the plurality of blocks including,
     a first block including,
      a first lateral face, a second lateral face opposing the first lateral face,
a top face,
a bottom face opposing the top face, the bottom face including a channel formed therein,
a first rounded convex end, and
a first rounded concave end opposing the rounded convex end,
wherein the channel (i) has a second rounded convex end adjacent to the first rounded convex end, (ii) has a second rounded concave end adjacent to the first rounded concave end, (iii) extends continuously to and between the second rounded convex end and the second rounded concave end and through the first rounded concave end.

2. The system of claim 1 wherein the channel does not extend through the first rounded convex end.

3. The system of claim 1 wherein a curved corner is formed by an intersection of the first rounded concave end and the first lateral side.

4. The system of claim 1 wherein the first lateral face and the second lateral face are parallel.

5. The system of claim 1 wherein the channel tapers towards the top face.

6. The system of claim 1 wherein the top face is flat.

7. The system of claim 1 wherein the bottom face includes a substantially U-shaped ridge extending adjacent to the channel along the first lateral face, the second lateral face and the first rounded convex end but not the first rounded concave end.

8. The system of claim 1 wherein the plurality of blocks include a second block having opposing lateral faces, opposing top and bottom faces, a first end and a rounded concave second end, wherein the rounded convex end of the first block is received within the rounded concave second end of the second block.

9. The system of claim 8 wherein the first rounded convex end of the first block is pivotably engaged with the rounded concave second end of the second block.

10. The system of claim 1 wherein the plurality of blocks include a third block having opposing lateral faces, opposing first and second ends, a bottom face and a top face, the top face of the third block including a circular protrusion received within the channel of the first block.

11. The system of claim 10 wherein the circular protrusion of the third block is rotatably received within the channel of the first block.

* * * * *